United States Patent [19]

Fox et al.

[11] 3,953,394

[45] Apr. 27, 1976

[54] POLYESTER ALLOYS AND MOLDING COMPOSITIONS CONTAINING THE SAME

[75] Inventors: Daniel W. Fox; Allen D. Wambach, both of Pittsfield, Mass.

[73] Assignee: General Electric Company, Pittsfield, Mass.

[22] Filed: Nov. 15, 1971

[21] Appl. No.: 199,037

[52] U.S. Cl............................ 260/40 R; 260/860; 260/873; 260/DIG. 35
[51] Int. Cl.$^2$.......................................... C08L 67/02
[58] Field of Search................ 260/40 R, 860, 873, 260/DIG. 24, 37 PC, DIG. 35

[56] References Cited

UNITED STATES PATENTS

| | | | |
|---|---|---|---|
| 2,465,319 | 3/1949 | Whinfield et al. | 260/75 R |
| 2,691,006 | 10/1954 | Flory | 260/860 X |
| 3,005,795 | 10/1961 | Busse et al. | 260/873 X |
| 3,148,172 | 9/1964 | Fox | 260/37 PC |
| 3,361,848 | 1/1968 | Siggel et al. | 260/873 |
| 3,382,305 | 5/1968 | Breen | 260/860 X |
| 3,437,631 | 4/1969 | Cleveland | 260/37 PC |
| 3,466,348 | 9/1969 | Wiener | 260/860 |
| 3,516,957 | 6/1970 | Grog et al. | 260/40 R X |
| 3,546,320 | 12/1970 | Duling et al. | 260/860 |
| 3,624,024 | 11/1971 | Caldwell et al. | 260/40 R |
| 3,639,331 | 2/1972 | Hattori et al. | 260/37 PC X |
| 3,644,267 | 2/1972 | Jackson et al. | 260/873 X |
| 3,654,219 | 4/1972 | Bager et al. | 260/37 PC X |
| 3,671,487 | 6/1972 | Abalins | 260/40 R |
| 3,742,087 | 6/1973 | Nield | 260/860 |

FOREIGN PATENTS OR APPLICATIONS

| | | | |
|---|---|---|---|
| 1,010,043 | 11/1965 | United Kingdom | 260/40 R |
| 772,627 | 4/1957 | United Kingdom | |
| 91,311 | 9/1971 | Japan | |

*Primary Examiner*—Lewis T. Jacobs
*Assistant Examiner*—S. M. Person
*Attorney, Agent, or Firm*—William F. Mufatti; Edward A. Hedman; James V. Costigan

[57] ABSTRACT

Thermoplastic, stable, blended compositions comprising a combination of (a) a poly(ethylene terephthalate) resin and (b) a poly(1,4-butylene terephthalate) resin. The alloyed combination of resins can be reinforced with fillers and also rendered flame retardant.

40 Claims, No Drawings

POLYESTER ALLOYS AND MOLDING COMPOSITIONS CONTAINING THE SAME

The present invention is concerned with thermoplastic polyester compositions. More particularly, it relates to alloyed combinations of polyesters, which provide advantages, both in terms of physical properties and economy in manufacture, over those obtainable with the individual components of the combination.

BACKGROUND OF THE INVENTION

High molecular weight linear thermoplastic polyesters, such as poly(ethylene terephthalate) and poly(1,4-butylene terephthalate) are well known as film and fiber-formers and they are provided by methods outlined in Whinfield et al, U.S. Pat. No. 2,465,319, and Pengilly, U.S. Pat. No. 3,047,539, and elsewhere.

The polyesters have not been exploited until very recently as molding and extrusion resins, however, because the most widely available member of the family, poly(ethylene terephthalate) crystallizes so slowly from the melt that three-dimensional parts molded from it, in conventional molding cycles, are brittle in thick sections.

This problem has been overcome to some extent by providing careful molecular weight control in the production of poly(ethylene terephthalate); by including nucleating agents, to hasten crystallization; or by using unconventional, long, two-step molding cycles.

With attention to the above-enumerated details, poly(ethylene terephthalate) molding compositions can be provided, including reinforced and flame retardant embodiments, but the compositions are expensive to produce.

With the discovery that certain members of the polyester family crystallize very much more rapidly than poly(ethylene terephthalate) has come the development of more economical molding compositions with equivalent and, in many cases superior properties, with the complete elimination of the need for precise molecular weight control, the inclusion of nucleating agents, and the use of commercially unattractive molding cycles.

By way of illustration, poly(1,4-butylene terephthalate) resins crystallize very rapidly from the melt. These provide excellent molding compositions because they can be fabricated with moderate stock temperatures, low mold temperatures and rapid cycle times. Because of their highly crystalline nature, these resins are superior in chemical resistance, thermal stability and product appearance (they have a smooth, glossy finish). Such resins also have superior strength, stiffness, low friction and wear properties and good resistance to brittle fracture.

The poly(butylene terephthalate) resins can also be provided in reinforced and flame retardant embodiments.

One disadvantage of the poly(1,4-butylene terephthalate) resins resides in their significantly higher cost of manufacture — in comparison with poly(ethylene terephthalate) — mainly due to the need to employ more expensive raw materials.

It has now been discovered that the need to modify the molecular weight, include nucleating agents and lengthen the molding cycles with poly(ethylene terephthalate) resins and the economic disadvantages inherent in producing molding compounds in which poly(butylenephthalate) resins are the thermoplastic component, can be eliminated and overcome by using a novel, alloyed combination of the two polyester resins in the molding compositions.

In addition to the above advantages, parts molded from the alloyed combination often show properties superior to those of either of the components in their pure stage.

It is unexpected to obtain the above results and advantages because most polymers are incompatible in that they do not form homogeneous blends that stay permanently homogeneous. It is believed that the difficulty in homogenizing such resins into an acceptable blend increases with differences in molecular weight of the individual components, with increasing concentrations of low molecular weight components or with differences in morphology and/or rates of crystallization. Because poly(ethylene terephthalate) is known to crystallize only very slowly from the melt and poly(1,4-butylene terephthalate) is known to crystallize very rapidly from the melt, in view of the above, it would be entirely unexpected to find that blends of these two resins prove to be highly compatible both on the macro and molecular scale. In other words, these two polyester resins, which should be incompatible on the basis of the wide difference in their rates of crystallization, have, in fact, been discovered to form a stable alloy.

Molded parts containing poly(ethylene terephthalate) alloyed with poly(butylene terephthalate), unmodified, as well as reinforced, and also flame retardant embodiments, have excellent appearance, with no delamination between polymeric phases. The appearance of parts molded from the alloy containing significant amounts of poly(ethylene terephthalate) is indistinguishable from the excellent appearance of parts molded from compositions containing poly(1,4-butylene terephthalate) as the sole resinous component.

Other evidence for the formation of a true alloy between the poly(ethylene terephthalate) resin and the poly(1,4-butylene terephthalate) resin is provided by differential scanning calorimetric data. The crystalline melting points are found to change with the concentration of the constituents and, in certain cases, only one melting point is seen, the alloy having formed a eutectic or single crystal phase. These data will be exemplified hereinafter.

As the result of the present invention, compositions are provided with alloyed polyester resins, the compositions having economic advantages, without sacrifice in moldability, strength and heat distortion temperature and such compositions are commercially attractive because of their compatibility on a molecular scale.

Minor amounts of other polyesters or copolyesters can be included in the alloys. For example, a small amount of poly(1,4-dimethylolcyclohexane terephthalate) can be present. Or small amounts of other aromatic dicarboxylic acids such as isophthalic acid and naphthalene dicarboxylic acid or aliphatic dicarboxylic acids, such as adipic acid may be substituted for the terephthalic acid components. Small amounts of other diols, such as propane diol, or 1,4-dimethylol cyclohexane can replace the aliphatic diols.

It is an object of this invention to improve the moldability of poly(ethylene terephthalate) while improving the properties of poly(1,4-butylene terephthalate) and to provide compositions having many properties improved over those of compositions containing either resin alone.

A further object is to provide means to custom formulate compositions of poly(ethylene terephthalate) and poly(1,4-butylene terephthalate) to obtain compositions having properties ranging between those obtained with compositions containing either resin alone.

Still another object is to provide compositions with substantially all of the properties of poly(1,4-butylene terephthalate), more economically than heretofore; and to provide compositions with economy approaching those containing poly(ethylene terephthalate) as the sole resinous component, but with improved properties.

It is a primary object of this invention to provide alloyed thermoplastic compositions comprising a poly(ethylene terephalate) and a poly(1,4-butylene terephthalate), wherein the disadvantages inherent in each of the resins are substantially overcome.

DESCRIPTION OF THE INVENTION

According to this invention there are provided thermoplastic, stable, blended compositions comprising in combination a. from about 1 to about 99 parts by weight of a poly(ethylene terephthalate) resin and
b. from about 99 to about 1 part by weight of a poly(1,4-butylene terephthalate) resin or a copolyester thereof with a minor amount of an aliphatic or aromatic dicarboxylic acid or an aliphatic polyol.

A preferred feature of this invention is to provide reinforced thermoplastic compositions comprising A. a stable, blended resinous combination comprising
a. from about 1 to about 99 parts by weight of a poly(ethylene terephthalate) resin and
b. from about 99 to about 1 part by weight of a poly(1,4-butylene terephthalate) resin or a copolyester thereof with a minor amount of an aliphatic or aromatic dicarboxylic acid or an aliphatic polyol; and
B. a reinforcing amount of a reinforcing filler for said combination.

Still another preferred feature of this invention is to provide flame retardant thermoplastic compositions comprising A. a stable, blended resinous combination comprising
a. from about 1 to about 99 parts by weight of a poly(ethylene terephthalate) resin and
b. from about 99 to about 1 part by weight of a poly(1,4-butylene terephthalate) resin or a copolyester thereof with a minor amount of an aliphatic or aromatic dicarboxylic acid or an aliphatic polyol and
B. a flame retardant additive in a minor proportion but in an amount at least sufficient to render resinous combination A non-burning or self-extinguishing.

According to another preferred feature of this invention, there are provided reinforced flame retardant thermoplastic compositions comprising A. a stable, blended resinous combination comprising
a. from about 1 to about 99 parts by weight of a poly(ethylene terephthalate) resin and
b. from about 99 to about 1 part by weight of a poly(1,4-butylene terephthalate) resin or a copolyester thereof with a minor amount of an aliphatic or aromatic dicarboxylic acid or an aliphatic polyol and
B. a reinforcing amount of a reinforcing filler for said combination A and
C. a flame retardant additive in a minor proportion but in an amount at least sufficient to render resinous combination A non-burning or self-extinguishing.

The present invention also contemplates alloyed, intercrystalline compositions comprising A. a stable, blended resinous combination comprising
a. from about 1 to about 99 parts by weight of a poly(ethylene terephthalate) resin and
b. from about 99 to about 1 part by weight of a poly(1,4-butylene terephthalate) resin or a copolyester thereof with a minor amount of an aliphatic or aromatic dicarboxylic acid or an aliphatic polyol, said combination preferably crystallizing very rapidly from the melt, and
B.
c. at least one high molecular weight normally crystalline, normally amorphous or normally partially crystalline and partially amorphous polymer in the concentration range of from about 1 to about 99 parts by weight of A to form about 99 to about 1 part by weight of B.

When used herein, and in the appended claims, the term "in combination" and "resinous combination" contemplates resins which alloy with each other and which remain intimately combined when cooled and solidified. Moreover, in all of the present compositions, the combinations are "stable" in the sense that, once formed, the alloys stay permanently homogeneous. Therefore, unstable combinations in which resinous components (a) and (b) either delaminate or separate when cooled, or in which the gross physical properties, chemical resistance, macroscopic appearance, and the like, clearly manifest failure to form stable alloys, are excluded from this invention. The three component blends of certain embodiments, i.e., the two polyesters and a third resin, are called "intercrystalline" for convenience to define blends or combinations of the alloy with the third resin. These intercrystalline compositions may or may not be true alloys in the sense defined above — but because they do not delaminate, the term "intercrystalline" composition is used to exclude blends which clearly manifest failure to form structurally useful compositions.

The poly(ethylene terephthalate) resin component (a) is disclosed in Whinfield et al U.S. Pat. No. 2,465,319. Such polymeric linear terephthalic esters are composed of recurring structural units of the formula

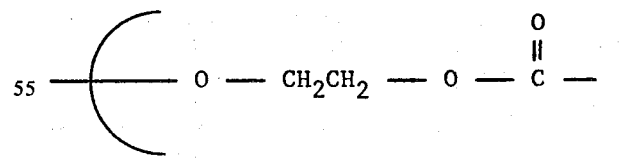

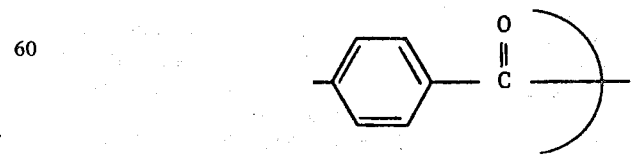

Such polyesters will have molecular weights high enough to have melting points above 200°C. Poly(ethylene terephthalate) resins can be made following the teachings of the Whinfield et al and Pengilly patents above-mentioned, incorporated herein by reference, and are available from a number of sources.

Preferred polyester resins for component (b) will be of the family consisting of high molecular weight, polymeric 1,4-butylene glycol terephthalates) having repeating units of the general formula

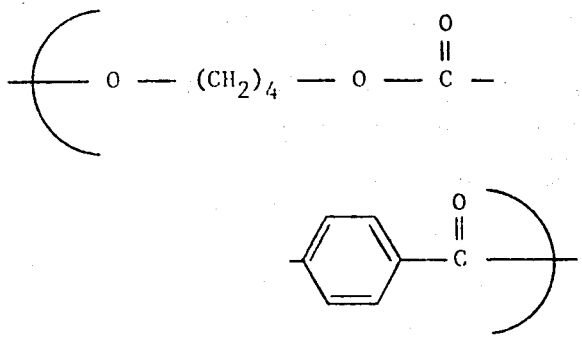

Also contemplated are mixtures of such esters with minor amount, e.g., from 0.5 to 2% by weight, of units derived from aliphatic or aromatic dicarboxylic acids and/or aliphatic polyols, e.g., glycols, i.e., copolyesters. These can also be made following the teachings of the Pengilly and Whinfield et al patents, abovementioned, suitably modified, if necessary. Poly(1,4-butylene terephthalate) is commercially available.

Especially preferred polyesters for use as component (b) are poly(1,4-butylene terephthalate) resins. Special mention is made of this polyester because it crystallizes at an especially rapid rate.

Among the units which can be present in the copolyesters are those derived from aliphatic dicarboxylic acids, e.g., of up to about 50 carbon atoms, including cycloaliphatic, straight and branched chain acids, such as adipic acid, cyclohexanediacetic acid, dimerized $C_{16}$–$C_{18}$ unsaturated acids (which have 32 to 36 carbon atoms), trimerized such acids, and the like. Among the units in the copolyesters can also be minor amounts derived from aromatic dicarboxylic acids, e.g., of up to about 36 carbon atoms, such as isophthalic acid and the like. In addition to the 1,4-butylene glycol units, there can also be minor amounts of units derived from other aliphatic glycols and polyols, e.g., of up to about 50 carbon atoms, including ethylene glycol, propylene glycol, glycerol, cyclohexanediol, and the like. Such copolyesters can be made by techniques well known to those skilled in the art.

Illustratively, sufficiently high molecular weight polyesters of both types, i.e., from component (a) and component (b) will have an intrinsic viscosity of at least 0.2 and preferably about 0.4 deciliters/gram as measured in o-chlorophenol, a 60/40 phenoltetrachloroethane mixture or a similar solvent at 25°–30°C. The upper limit is not critical, but it will generally be about 2.5 dl./g. Especially preferred polyesters will have an intrinsic viscosity in the range of 0.5 to 1.3.

As noted above, poly(ethylene terephthalate) resins and poly(1,4-butylene terephthalate) and/or copolyester resins are combinable with each other in all proportions. Consequently, alloyed combinations comprising from 1 to 99 parts by weight of poly(ethylene terephthalate) and from 99 to 1 part by weight of poly(1,4-buytylene terephthalate) resins are included within the scope of the invention. In general, however, compositions containing from about 10 to about 90, and especially from about 20 to about 80, parts by weight of poly(ethylene terephthalate) and from about 90 to about 10, and especially from about 80 to about 20, parts by weight of poly(1,4-butylene terephthalate) resins exhibit the best overall combination of properties and these concentrations are preferred.

As has been mentioned a preferred class of compositions will comprise the alloyed polyesters and a reinforcing amount of a reinforcing filler. In general, any reinforcement can be used, e.g., fibers, whiskers or platelets of metals, e.g., aluminum, iron or nickel, and the like, and non-metals, e.g., ceramics, carbon filaments, silicates, asbestos, $TiO_2$ and titanate whiskers, quartz, glass flakes and fibers and the like. It is to be understood that, unless the filler adds to the strength, stiffness and impact strength of the composition, it is only a filler and not a reinforcing filler as contemplated herein.

Although it is only necessary to have at least a reinforcing amount of the reinforcement present, in general, the alloyed combination of polyester components (a) and (b) will comprise from about 20 to about 99 parts by weight and the filler will comprise from about 1 to about 80 parts by weight of the total composition.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the present compositions, it is convenient to use the filamentous glass in the form of chopped strands of from about ⅛ inch to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 inch and 0.125 (⅛) inch.

In general, best properties will be obtained if the sized filamentous glass reinforcement comprises from about 1 to about 80% by weight based on the combined weight of glass and polyesters and preferably from about 5 to about 50% by weight. Especially preferably the glass will comprise from about 10 to about 40% by weight based on the combined weight of glass and resins. Generally, for direct molding use, up to about 60% of glass can be present without causing flow problems. However, it is useful also to prepare the compositions containing substantially greater quantities, e.g., up to 70–80% by weight of glass. These concentrates can then be custom blended with blends of resins that are not glass reinforced to provide any desired glass content of a lower value.

Because it has been found that certain commonly used flammable sizings on the glass, e.g., dextrinized starch or synthetic polymers, contribute flammability often in greater proportion than expected from the amount present, it is preferred to use lightly sized or unisized glass reinforcements in those compositions of the present invention which are flame retardant. Sizings, if present, can readily be removed by heat cleaning or other techniques well known to those skilled in the art.

It is a preferred feature of this invention also to provide flame retardant glass reinforced thermoplastic compositions, as defined above, because the polyesters are normally flammable, the compositions also including a flame retardant additive in a minor proportion but in an amount at least sufficient to render the polyester resin non-burning or self-extinguishing.

Non-dripping embodiments are provided if the flame retardant compositions also include a polytetrafluoroethylene resin or a fumed colloidal silica in a minor proportion based on the composition but in an amount at least sufficient to render said polyester resin non-dripping, when burning.

When used herein, the terms "non-burning", "self-extinguishing" and "non-dripping" are used to describe compositions which meet the standards of ASTM test method D-635 and Underwriter's Laboratories Bulletin No. 94. Another recognized procedure to determine flame resistance of resinous compositions is the Oxygen Index Test or LOI (Limiting Oxygen Index). This test is a direct measure of a product's combustibility based on the oxygen content of the combustion atmosphere. Appropriate specimens are placed in a combustion chimney and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test method D-2863. The compositions of this invention which contain flame-retardant additives in the specified amounts have a substantially higher oxygen index and thus are much less combustible than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with an organic or inorganic antimony compound, e.g., antimony oxide; elemental phosorus or a phosphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition — major proportions will detract from physical properties — but at least sufficient to render the polyester resin-blend non-burning or self-extinguishing. Those skilled in the art are well aware that the amount will vary with the nature of the polymers in the blend and with the efficiency of the additive. In general, however, the amount of additive will be from 0.5 to 50 parts by weight per hundred parts of components (a) plus (b). A preferred range will be from about 3 to 25 parts and an especially preferred range will be from about 5 to 15 parts of additive per 100 parts of (a) plus (b). Smaller amounts of compounds highly concentrated in the elements responsible for flame-retardance will be sufficient, e.g., elemental red phosphorus will be preferred at 0.5 to 10 parts by weight per hundred parts of (a) plus (b), while phosphorus in the form of triphenyl phosphate will be used at 5 to 25 parts of phosphate per part of (a) plus (b), and so forth. Halogenated aromatics will be used at 2 to 20 parts and synergists, e.g., inorganic or organic antimony compounds, such as antimony oxide, will be used at about 1 to 10 parts by weight per 100 parts of components (a) plus (b).

Among the useful halogen-containing compounds are those of the formula

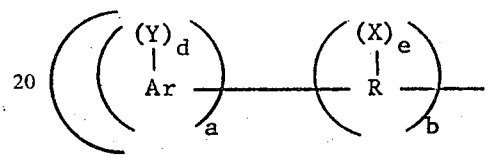

wherein $n$ is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; a sulfur-containing linkage, e.g., sulfide, sulfoxide, sulfone, carbonate; a phosphorus-containing linkage; and the like. R can also consist of two or more alkylene or alkylidene linkages connected by such groups as aromatic, ether, ester, carbonyl, sulfide, sulfoxide, sulfone, a phosphorus-contaning linkage, and the like. R can be a dihydric phenol, e.g., bisphenol-A, carbonate linkage. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter *d* represents a whole number ranging from 1 to a maximum equivalent to the number of replaceable hydrogens substituted on the aromtic rings comprising Ar or Ar'. The letter *e* represents a whole number ranging from 0 to a maximum controlled by the number of replaceable hydrogens on R. The letters *a*, *b*, and *c* represent whole numbers including 0. When *b* is not 0, neither *a* nor *c* may be 0. Otherwise either *a* or *c*, but not both, may be 0. Where *b* is 0, the aromatic groups are joined by a direct carbon-to-carbon bond.

The hydroxyl and Y substituents on the aromatic groups, Ar and Ar' can be varied into the ortho, meta or para positions on the aromatic rings and the groups can be in any possible geometric relationship with respect to one another.

Included within the scope of the above formula are diaromatics of which the following are representative:
2,2-bis(3,5-dichlorophenyl)propane
bis(2-chlorophenyl)methane
bis(2,6-dibromophenyl)methane
1,1-bis(4-iodophenyl)ethane
1,2-bis(2,6-dichlorophenyl)ethane
1,1-bis(2-chloro-4-iodophenyl)ethane
1,1-bis(2-chloro-4-methylphenyl)ethane
1,1-bis(3,5-dichlorophenyl)ethane
2,2-bis(3-phenyl-4-bromophenyl)ethane
2,3-bis(4,6-dichloronaphthyl)propane
2,2-bis(2,6-dichlorophenyl)pentane
2,2-bis(3,5-dichromophenyl)hexane
bis(4-chlorophenyl)phenylmethane
bis(3,5-dichlorophenyl)cyclohexylmethane
bis(3-nitro-4-bromophenyl)methane
bis(4-hydroxy-2,6-dichloro-3-methoxyphenyl)methane
2,2-bis(3,5-dichloro-4-hydroxyphenyl)propane
2,2-bis(3-bromo-4-hydroxyphenyl)propane.

The preparation of these and other applicable biphenyls are known in the art. In place of the divalent aliphatic group in the above examples may be substituted sulfide, sulfoxy and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl or a compound comprising two phenyl radicals separated by a divalent alkylene group and having at least two chlorine or bromine atoms per phenyl nucleus, and mixtures of at least two of the foregoing.

Especially preferred are hexabromobenzene and brominated or chlorinated biphenyls or terphenyls, alone, or mixed with antimony oxide.

In general, the preferred phosphate compounds are selected from elemental phosphorus or organic phosphonic acids, phosphonates, phosphinates, phosphonites, phosphinites, phosphene oxides, phosphenes, phosphites or phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

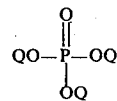

and nitrogen analogs thereof where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Q's is aryl. Typical exampls of suitable phosphates include, phenylbisdodecyl phosphate, phenylbisneopentyl phosphate, phenylethylene hydrogen phosphate, phenylbis(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl)-phenyl phosphate, tri(nonylphenyl)phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl)phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)-phosphine oxide or tetrakis(hydroxymethyl)phosphonium chloride. These flame-retardant additives are commercially available.

Particularly preferred flame retardant additives for use in this invention are low molecular weight polymers of a carbonate of a halogenated dihydric phenol. Preferred such polymers contain from 2 to 10 repeating units of the formula

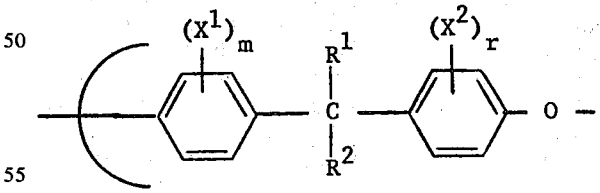

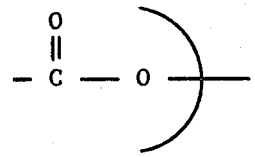

wherein $R^1$ and $R^2$ are hydrogen, (lower)alkyl or phenyl, $X^1$ and $X^2$ are bromo or chloro and $m$ and $r$ are from 1 to 4. The polymeric additives will have a low volatility when heated above 200°C., and a softening point of less than about 300°C. They will be used alone or in combination with synergists, such as inorganic or organic antimony-containing compounds.

These polymeric additives can be made by polymerizing a mixture of a halogenated dihydric phenol and a chain stopper, e.g., an alcohol, carboxylic acid, carboxylic acid halide or, preferably a monohydric phenol, and most preferably a halogenated phenol and phosgene or a reactive derivative thereof in the presence of an acid acceptor, e.g., an amine or caustic. Details concerning the preparation and use of such compounds are given in the copending patent application of Daniel W. Fox, "Flame Retardant Compounds and Thermoplastic Compositions Containing the Same" Ser. No. 194,518, filed on or about Nov. 1, 1971, now U.S. Pat. No. 3,855,277, and incorporated herein by reference.

The most preferred such additive can be made by polymerizing a mixture of tetrabromobisphenol-A and 2,4,6-tribromophenol with phosgene in either methylene chloride in the presence of pyridine or in methylene chloride containing triethylamine in admixture with an aqueous caustic phase. The product of such a process will be a polymer of the formula:

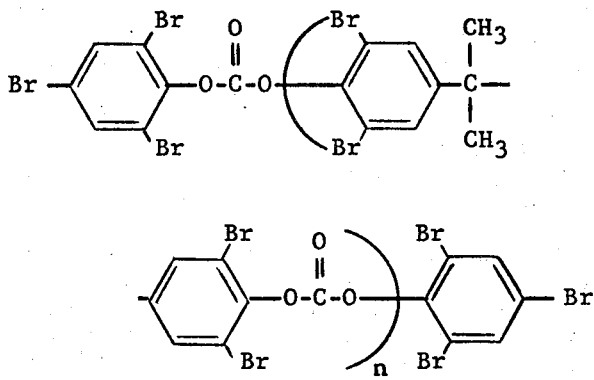

wherein the average number of repeating units, n, will be from about 3 to about 7, and the softening point will be in the range of from 200° to 260°C.

The preferred polymeric additives can be used within the concentration ranges specified above for halogenated compounds in general, but preferably will be used in amounts of from about 5 to about 25 parts by weight per 100 parts by weight of the flammable resinous components in the composition, e.g., components (a) and (b), and also any normally flammable co-blending resin, e.g., polypropylene, as the case may be.

The polytetrafluoroethylene resins used in the compositions of this invention to retard dripping of flaming resin are commercially available or can be prepared by known processes. They are white solids obtained by free radical initiated polymerization of tetrafluoroethylene in aqueous media with free radical catalysts, e.g., sodium, potassium, or ammonium peroxydisulfates at 100 to 1000 psi. at 0°–200°C., and preferably at 20°–100°C. See Brubaker, U.S. Pat. No. 2,393,967. While not essential, it is preferred to use the resins in the form of relatively large particles, e.g., of average size 0.3 to 0.7 mm., mostly 0.5 mm. These are better than the usual polytetrafluoroethylene powders which have particles of from 0.05 to 0.5 millimicrons in diameter. It is especially preferred to use the relatively large particle size material because it tends to disperse readily in polymers and bond them together into fibrous networks. Such preferred polyethylenes are designated by ASTM as Type 3, and are available commercially from the DuPont Company (TEFLON Type 6) for general use in the extrusion of thin-walled tubular goods and tape.

The amount of polytetrafluoroethylene to be used can vary widely, from an amount at least sufficient to render the polyester non-dripping (when burning) but usually will be from about 0.1 to about 10 parts and preferably from about 0.5 to about 2.5 parts by weight per hundred parts by weight of the combination of components (a) plus (b), and also any normally flammable co-blending resin, e.g., polypropylene, as the case may be.

The fumed colloidal silica employed in the non-dripping embodiments is preferably a finely powdered form. A silica which is particularly preferred is commercially available as Cab-O-Sil EH-5 from the Cabot Corporation. Cab-O-Sil EH-5 is a submicroscopic fumed silica having on a dry basis 99% silicon dioxide. It has a surface area of $390 \pm 40$ m$^2$/gm. (BET), a nominal particle size of 0.007 micron, a maximum density of 2.3 lbs./cu.ft., an ignition loss of 2.5% (1000°C. on a moisture free basis) and a pH of 3.5–4.2 (4% aqueous dispersion). The fumed colloidal silica may be employed at a range of 0.25 to 4 parts by weight per 100 parts by weight of components (a) plus (b). However, a particularly preferred range is 0.5 to 2.5 parts by weight. Within this particularly preferred range it has been found advantageous to employ in most compositions about 1.25 parts by weight per 100 parts by weight of components (a) plus (b); and also any normally flammable co-blending resins, e.g., polypropylene, as the case may be.

The intercrystalline thermoplastic compositions of this invention comprise the alloyed polyesters, as described above, in admixture with at least one additional polymer, which is not a poly(ethylene terephthalate) or a poly(butylene terephthalate) or copolyester thereof. These can be reinforced and/or rendered flame retardant following the above teachings. The advantages, i.e., economic and property enhancement, of combining the polyester components into alloys mentioned above are carried over into the intercrystalline compositions. In addition such compositions are advantageous because the properties of the polyester alloy can be used to enhance the properties of the co-blending polymer and vice-versa. Merely by way of illustration, the hydrolytic stability of the polyester alloy will be enhanced by forming an intercrystalline combination with a polyolefin, e.g., polypropylene homopolymers and copolymers, and the strength, rigidity and resistance to heat distortion of the polyolefins will be improved by the polyester alloy. Numerous additional advantages could also be mentioned.

In preparing the intercrystalline compositions, it is important to use a polyester alloy which crystallizes very rapidly from the melt. Polyester alloys which meet the criterion of being rapidly crystallizable from the melt will be those which can be injection molded into a relatively cold mold at about 170°F. in a standard, short cycle time and produce a rigid workpiece which is highly crystalline throughout. As is described in Furukawa et al, U.S. Pat. No. 3,368,995, poly(ethylene terephthalate) alone, i.e., without nucleating agents, will not produce such a workpiece because of its high crystalline melting point and low heat conductivity. Because such a polyester resin is not rapidly crystallizable, the outer part of the workpiece is amorphous, and the inner part, which is gradually cooled, is crystalline.

One convenient way to determine if a polyester alloy is suitable for use in this invention is to injection mold it with the mold temperature of 75°–200°F. in a standard short cycle, e.g., 10–90 seconds, into workpieces 1/16 to ½ inch thick. If the molded piece is rigid on removal from the mold and the inner and outer parts of the piece are uniformly milky or white and opaque and if the hardness, measured, e.g., with a Rockwell M tester, is uniform throughout, crystallization from the melt is rapid enough to be suitable. If, on the other hand, the workpiece is clear, transparent or semitransparent (i.e., amorphous) on the outside and milky, white or opaque (i.e., crystalline) only on the inside; if the hardness is non-uniform throughout; if the workpiece is relatively soft on removal from the mold and brittle after it cools; or if uniformity can be achieved only by using a two stage molding cycle, or higher mold temperatures, e.g., 250°–330°F. and long times, e.g., 90–400 seconds., then the polyester resin alloy is not suitable for this invention.

It is to be noted that a broad range of concentration of the poly(ethylene terephthalate) component (a) is contemplated for the present alloys, i.e., 1 to 99 percent by weight. The most preferred alloys contain relatively lower ratios of this component because of its slower rate of crystallization. The compositions having higher ratios of the poly(ethylene terephthalate) can be substantially improved by use of a nucleating agent, such as a carbon powder, metal salts, clays, talc and the like, although this is not critical. In general, such nucleating agent can consist of carbon powders, the oxides, sulfates, phosphates, silicates, oxalates, stearates, benzoates, salicyclates or tartrates of metals of Group II of the Periodic Table of Elements and neutral clays. The minimum amount of such materials will be sufficient to effect nucleation and will generally range from 0.1 to 3%, based on the amount of poly(ethylene terephthalate) in the composition.

The co-blending, combining polymers will form an intercrystalline normally rigid reinforceable composition with the rapidly crystallizable polyester alloy. Accordingly, the co-blending polymer component can itself be normally crystalline, normally amorphous or mixed crystalline and amorphous. Crystallinity as used herein is that which arises from a state of molecular structure which denotes compactness of the molecular chains forming the polymer. It is attributable to the formation of solid crystals having a definite geometric form.

As is well understood by those skilled in the art, the same high molecular weight polymer, depending often on the way it is produced, can exist in wholly crystalline, wholly amorphous or partially crystalline and partially amorphous form. Merely by way of illustration, polymers of the same alpha olefin, e.g., polypropylene, have different steric structures, and depending on their steric configurations, they may be crystallizable or amorphous, or mixed.

Although as will be seen, the co-blending polymer can be either normally solid or normally rubbery, the compositions of this invention are all normally rigid. Therefore, if the co-blending polymer is rubbery, the maximum amount used is that which insures that the final composition will be rigid at ordinary temperatures, e.g., about 75°–90°F.

In general, the co-blending polymer component of this invention will be a polymerization product of i. at least one aliphatic ethylenically unsaturated monomer, e.g., ethylene, propylene or an olefin of from 4 to 10 carbon atoms, e.g., butene-1, methyl pentene, decene-1, and the like, including vinyl monomers, such as a vinyl halide or a vinylidene halide, for example, vinyl chloride, vinylidene chloride, or vinyl alkanoates, e.g., vinyl acetate, acrylic monomers such as acrylic acid, acrylic esters, alkyl methacrylates, acrylic nitriles, such as acrylonitrile, methacrylonitrile, and the like;

ii. at least one difunctionally reactive compound which is polymerizable by condensation, such as formaldehyde, trioxymethylene, phenols, e.g., 2,6-dimethylphenol, siloxanes, lactams, e.g., caprolactam, aromatic sulfides, and the like;

iii. at least two difunctionally reactive compounds which are polymerizable by polycondensation, such as a diamine, e.g., hexamethylenediamine, and a dicarboxylic acid, e.g., adipic acid, a polyorganosiloxane and an aromatic ester, a bis maleimide and an amine, an ether of a bis phenol and a dichlorodiphenyl sulfone and the like; or iv. a mixture of the polymerization products of (i), including vinyl aromatic compounds, e.g., styrene, and (ii), such as blended combinations of polystyrene and polyphenylene ether; polyethylene or polybutene-1 and a polyphenylene ether, polystyrene with a wholly aromatic polyester, e.g., from resorcinol and terephthaloyl chloride, and the like.

Among the preferred features of this invention are compositions wherein the co-blending polymer is a polymerization product of at least one aliphatic ethylenically unsaturated monomer and is selected from polyethylene, polypropylene and other polyolefins and copolymers of such monomers, for example, poly(methylpentene), normally solid copolymers of ethylene and butene-1, copolymers of propylene and ethylene, copolymers of ethylene and ethyl acrylate, or vinyl acetate, butadiene-acrylonitrile copolymers, ionomers, poly(methyl methacrylate), polyisobutylene rubbers and the like, poly(vinyl chloride), poly(vinylidene chloride), a copolymer of vinyl chloride with vinyl acetate, natural rubber, a rubbery copolymer of butene-1 and ethylene, a rubbery copolymer of butadiene and acrylonitrile, and the like. All such polymers are commercially available or can be prepared by techniques well known to those skilled in the art. As to the copolymers and terpolymers, the proportions of the repeating units may vary broadly and will be selected to provide the desired characteristics, i.e., normally rubbery, normally solid, and the like. In addition to the polymers illustrated above, other suitable polymerization products of aliphatic ethylenically unsaturated monomers include derivatives thereof, such as halogenated hydrocarbon polymers, e.g., chlorinated polyethylene, chlorosulfonated polyhydrocarbons and polymerized carboxy-substituted butadiene and the like.

Other preferred co-blending polymer components are selected from polyacetal homopolymers, such as polyoxymethylene, polyacetal copolymers, such as those based on trioxane, polyphenylene ethers, such as poly(2,6-dimethyl-1,4-phenylene)ether, polysulfones, such as the condensation product of bisphenol-A and 4,4'-dichlorodiphenyl sulfone, polyamides, such as polycaprolactam, or the product of hexamethylenediamine and adipic acid, polyimides, e.g., the product of bismaleimido diphenyl methane and methylene dianiline, normally solid or normally rubbery polyorganosiloxanes, such as polyalkyl or aryl-siloxanes, or combinations of the two, and copolymers of polyorganosiloxanes with vinyl aromatics, e.g., styrene, acrylic monomers, e.g., methyl methacrylate, or aromatic esters, e.g., the reaction products of bisphenol-A and iso or terephthaloyl chloride, as well as siloxane-nitrogen copolymers containing amido, amide-imido and imide groups. All such polymers are either commercially available or can be made in ways known to those skilled in the art.

Also preferred are co-blending polymer components which comprise mixtures of any of classes (i), (ii) and/or (iii). For example, one such mixture would comprise a high molecular weight composition which is a combination of polystyrene or other styrene resin, including rubber modified polystyrenes (i) with a condensation product of 2,6-dimethylphenol, i.e., poly(2,6-dimethyl-1,4-phenylene)ether.

Especially preferred compositions within the scope of this invention are those in which the intercrystalline combination contains from about 1 to about 99 parts by weight, and preferably from 15 to 85 parts by weight, of the above-mentioned alloy of poly(ethylene terephthlate) and a poly(butylene terephthalate) or copolyester thereof, and from about 99 to about 1, and preferably from 95 to 5 parts by weight of either high molecular weight normally crystalline linear polypropylene homopolymer or copolymer. The preferred polyester component (b) in such compositions is poly(1,4-butylene terephthalate).

The method of blending the alloys and compositions of this invention is not critical and can be carried out by conventional techniques. One convenient method comprises blending the polyesters in powder or granular form, extruding the blend and comminuting into pellets or other suitable shapes.

The reinforcements and other additives are added in any usual manner, e.g., by dry mixing or by mixing in the melted state in an extruder, on a heated mill or in other mixers.

By way of illustration, glass roving (a bundle of strands of filaments) is chopped into small pieces, e.g., ⅛ inch to 1 inch in length, and preferably less than ¼ inch in length and put into an extrusion compounder with the polyester resins, and, if used, the co-blending polymer, the flame retardant additive(s) and polytetrafluoroethylene or fumed colloidal silica to produce molding pellets. The fibers are shortened and predispersed in the process, coming out at less than 1/16 inch long. In another procedure, glass filaments are ground or milled to short lengths, and are mixed with the polyester resins, and, optionally, co-blending polymer, flame retardant additive and polytetrafluoroethylene resin or fumed colloidal silica, by dry blending then either fluxed on a mill and ground, or they are extruded and chopped. In still another procedure continuous lengths of glass roving are drawn through a bath of melted polyester resins, and, optionally, the co-blending, second polymer, the flame retardant additive(s) and polytetrafluoroethylene resin, or fumed colloidal silica, e.g., in an extruder, which procedure coats the filaments, and then the resin-coated glass strand is comminuted into pellets to form a molding compound. The glass fibers can also be mixed with resin and additives and directly molded, e.g., by injection or transfer molding techniques.

It is always very important to thoroughly free all of the ingredients, the polyester resin(s), co-blending polymer, reinforcing filler, and flame retardant additives, from as much water as possible.

In addition, compounding should be carried out to insure that the residence time in the machine is short; the temperature is carefully controlled; the frictional heat is utilized; and an intimate blend between the resin and the additives is obtained.

Although it is not essential, best results are obtained if the ingredients are precompounded, pelletized and then molded. Precompounding can be carried out in conventional equipment. For example, after carefully pre-drying the polyester resins, the co-blending polymer and other additives, and the reinforcement, e.g., under vacuum at 100°C. for 12 hours, a single screw extruder is fed with a dry blend of the ingredients, the screw employed having a long transition section to insure proper melting. On the other hand, a twin screw extrusion machine, e.g., a 28 mm. Werner Pfleiderer machine can be fed with resins and additives at the feed port and reinforcement down stream. In either case, a generally suitable machine temperature will be about 300° to 600°F.

The precompounded composition can be extruded and cut up into molding compounds, such as conventional granules, pellets, etc., by standard techniques.

The compositions can be molded in any equipment conventionally used for reinforced thermoplastic compositions. For example, good results will be obtained in an injection molding machine, e.g., of the Newbury type, with conventional cylinder temperatures, e.g., 500°F. and conventional mold temperatures, e.g., 150°F. If necessary, depending on the molding properties of the co-blending polymer, the amount of reinforcing filler and the rate of crystallization of the polyester component, those skilled in the art will be able to make the conventional adjustments in molding cycles to accommodate the composition.

DESCRIPTION OF THE PREFERRED EMBODIMENTS

The following examples illustrate the invention. They are set forth as a further description, but are not to be construed as limiting the invention thereto.

EXAMPLES 1-6

The following ingredients are dried:
poly(1,4-butylene terephthalate), intrinsic viscosity, 0.7 dl./g.; melting point, 225°C,; and
poly(ethylene terephthalate), intrinsic viscosity, 1.0 dl./g.; melting point, 258°C.

The dry blends are precompounded at 450°F. in an extruder. The extrudate is pelletized and the melting points of the resulting compositions according to this invention are measured in a differential scanning calorimeter. The data are summarized in Table 1.

Table 1.

| Crystalline Melting Point Temperatures of Alloys of Poly(ethylene terephthalate) and Poly(1,4-butylene terephthalate) | | | | |
|---|---|---|---|---|
| Example | 1A* | 1 | 2 | 3 |
| Ingredients (parts by weight) | | | | |
| poly(1,4-butylene terephthalate) | 100 | 90 | 80 | 70 |
| poly(ethylene terephthalate) | 0 | 10 | 20 | 30 |

Table 1.-continued

Crystalline Melting Point Temperatures of Alloys of Poly(ethylene terephthalate) and Poly(1,4-butylene terephthalate)

| Example | 1A* | 1 | 2 | 3 |
|---|---|---|---|---|
| Properties | | | | |
| Melting point No. 1 | 225 | 223 | 224 | 220 |
| Melting point No. 2 | none | none | none | 234 |

*Control

| Example | 4 | 5 | 6 | 6A* |
|---|---|---|---|---|
| Ingredients (parts by weight) | | | | |
| poly(1,4-butylene terephthalate) | 60 | 50 | 20 | 0 |
| poly(ethylene terephthalate) | 40 | 40 | 80 | 100 |
| Properties | | | | |
| Melting point No. 1 | 216 | 213 | 223 | none |
| Melting point No. 2 | 238 | 245 | 248 | 258 |

*Control

The above results demonstrate that these polyesters are compatible and stable. It is a matter of common knowledge that incompatible, crystalline polymers show two distinct crystal melting points, each exactly that of the individual components. These two melting points remain the same, regardless of the relative concentrations of the components. On the other hand, if compatible crystalline materials are blended, the melting points will change as the concentration is varied. Such blends are alloys. In certain cases, only one melting point is seen at given ratios of the two alloyed components. At these concentrations, the alloy forms a eutectic, which is a single crystal phase.

In the data of Table 1, Melting Point No. 1 is attributable to poly(1,4-butylene terephthalate), and Melting Point No. 2 is due to poly(ethylene terephthalate). Because these vary with the relative concentrations, and disappear at certain ratios, it can be seen that these compositions according to this invention are alloyed.

EXAMPLES 7–12

The following ingredients are dried in a vacuum at 100°C. for 10 hours:
poly(1,4-butylene terephthalate), as in Example 1;
poly(ethylene terephthalate), as in Example 1.

The dry blends are precompounded at 480°F. by passing them through a one in. Wayne single screw extruder. The screw has a long transition section to insure proper melting. The extrudate is pelletized and the pellets are injection molded at 480°F. (mold, 150°F.) into ASTM type best test bars in a 3 oz. Newbury machine. The test bars are tested for the following physical properties: Tensile strength and elongation, ASTM D-1708; Flexural strength and modulus, ASTM D-790; Impact strength, ASTM D-256; and Heat distortion temperature, ASTM D-648. The formulations used and the results obtained are set out in Table 2:

Table 2.

Physical Properties of Alloys of Poly(ethylene terephthalate) and Poly(1,4-butylene terephthalate)

| Examples | 7 | 8 | 9 |
|---|---|---|---|
| Ingredients (parts by weight) | | | |
| poly(1,4-butylene terephthalate) | 90 | 80 | 70 |
| poly(ethylene terephthalate) | 10 | 20 | 30 |

Table 2.-continued

Physical Properties of Alloys of Poly(ethylene terephthalate) and Poly(1,4-butylene terephthalate)

| Examples | 7 | 8 | 9 |
|---|---|---|---|
| Properties | | | |
| Heat distortion temp., °F., at 264 psi. | 144 | 149 | 147 |
| Flexural strength, psi. | 11,910 | 9,000 | 10,370 |
| Flexural modulus, psi. | 372,000 | 386,000 | 406,000 |
| Tensile strength, psi. | 7,820 | 5,830 | 7,150 |
| Elongation, % | 4.6 | 3.3 | 4.2 |
| Impact strength, ft.-lbs./in. notch | 0.36 | 0.22 | 0.36 |

| Examples | 10 | 11 | 12 |
|---|---|---|---|
| Ingredients (parts by weight) | | | |
| poly(1,4-butylene terephthalate) | 60 | 50 | 20 |
| poly(ethylene terephthalate) | 40 | 50 | 80 |
| Properties | | | |
| Heat distortion temp., °F. at 264 psi. | 140 | 151 | 156 |
| Flexural strength, psi. | 12,870 | 13,820 | 13,270 |
| Flexural modulus, psi. | 394,000 | 391,000 | 368,000 |
| Tensile strength, psi. | 7,460 | 8,160 | 7,370 |
| Elongation, % | 4.3 | 5.5 | 5.2 |
| Impact strength, ft.-lbs./in. notch | 0.51 | 0.57 | 0.60 |

Thus the two polymers with vastly different rates of crystallization are seen to form useful compositions. The specific gravity increases with poly(ethylene terephthalate) concentration, but tensile and flexural strengths remain high, as does the heat distortion temperature. Impact strength is substantially improved as the poly(ethylene terephthlate) is increased above 40 parts by weight per 100 parts by weight of the total alloy. Moldability and surface appearance in all cases are outstanding. No delamination is seen indicating compatibility on a macro as well as a molecular scale.

EXAMPLES 13–14

The following ingredients are dried:
poly(1,4-butylene terephthalate), as in Example 1;
poly(ethylene terephthalate), as in Example 1; and
fibrous glass reinforcement, ⅛ inch.

The compositions are extruded and molded by the procedure of Example 7 and the properties obtained are set out in Table 3:

Table 3.

Physical Properties of Reinforced Alloys of Poly-(1,4-butylene terephthalate) and Poly(ethylene terephthalate).

| Examples | 13 | 14 |
|---|---|---|
| Ingredients (parts by weight) | | |
| poly(1,4-butylene terephthalate) | 80 | 50 |
| poly(ethylene terephthalate) | 20 | 50 |
| fibrous glass reinforcement | 43 | 43 |
| Properties | | |
| Heat distortion temp., °F., at 264 psi. (⅛") | 405 | 394 |
| Flexural strength, psi. | 18,340 | 23,040 |
| Flexural modulus, psi. | 912,000 | 954,000 |
| Tensile strength, psi. | 12,360 | 16,750 |
| Elongation, % | 3.0 | 4.8 |
| Impact strength, ft.-lbs./in. notch | 2.15 | 2.0 |

The effect of fibrous glass reinforcement in enhancing heat distortion resistance, stiffness and impact strength is seen by comparison with the un-reinforced compositions of Examples 8 and 11. These stable compositions according to this invention have outstanding surface appearance, process easily and pieces molded from them show no tendency to delaminate or become inhomogeneous on cooling and standing.

Although they contain 30% by weight of glass reinforcement, only about 1% by weight of glass is sufficient to elevate heat distortion, in comparison with the controls. In addition, in many cases, processability, especially moldability is improved markedly by the addition of only about 1% of glass.

EXAMPLE 15

In an extruder are blended 35 parts by weight of poly(1,4-butylene terephthalate), 35 parts by weight of poly(ethylene terephthalate); 30 parts by weight of ⅛ inch fibrous glass reinforcement, 17.2 parts per hundred of resin of poly(2,2-bis(3,5-dibromo-4-hydroxyphenyl)propane carbonate) terminated with tribromophenoxy groups (having about 5 repeating units and prepared by reacting 0.05 moles of tetrabromobisphenol-A, 0.02 moles of tribromophenol and phosgene in methylene chloride and pyridine), and 4.3 parts per hundred of resin of antimony oxide. The composition is injection molded into test pieces which are self-extinguishing within 5 seconds after two 10-second ignitions by an open flame, with no flaming dripping and a maximum of 10 sec. after glowing (SE-O, Underwriter's Bulletin 94 flame test) and the Oxygen Index is 29% (ASTM D-2863). There is no observable plate-out or volatilization of the additive components during processing. A glass reinforced flame retardant composition according to this invention is obtained.

EXAMPLE 16

In an extruder are blended 35 parts by weight of poly(1,4-butylene terephthalate), 35 parts by weight of poly(ethylene terephthalate), 30 parts by weight of ⅛ inch fibrous glass reinforcement, 7 parts by weight of hexabromobenzene, 3 parts by weight of antimony oxide and 1.5 parts by weight of finely divided polytetrafluoroethylene resin, average particle size, 0.3–0.7 mm. The composition is injection molded into test pieces which are flame-retardant and do not drip, while burning.

The procedures of Examples 15 and 16 can be repeated using the following formulations:

| Ingredients | Parts by weight |
| --- | --- |
| poly(1,4-butylene terephthalate) | 50 |
| poly(ethylene terephthalate) | 50 |
| poly(2,2-bis(3,5-dibromo-4-hydroxyphenyl)propane carbonate) terminated with tribromophenoxy groups | 17.2 |
| poly(1,4-butylene terephthalate) | 35 |
| poly(ethylene terephthalate) | 35 |
| fibrous glass reinforcement | 30 |
| hexabromobenzene | 7 |
| antimony oxide | 3 |
| triphenyl phosphine oxide | 3 |
| poly(1,4-butylene terephthalate) | 50 |
| poly(ethylene terephthalate) | 50 |
| hexachlorobiphenyl | 10 |
| triphenyl antimony | 5 |
| poly(1,4-butylene terephthalate) | 35 |
| poly(ethylene terephthalate) | 35 |
| fibrous glass reinforcement | 30 |
| hexabromobenzene | 7 |
| antimony oxide | 3 |
| fumed colloidal silica | 1 |

Flame retardant unreinforced and reinforced compositions according to this invention are obtained. Fumed colloidal silica prevents dripping, while burning.

EXAMPLE 17

In an extruder are blended 10, 20, 30, 40, 50, 60 and 70 parts by weight of a 1:1 mixture of poly(1,4-butylene terephthalate) and poly(ethylene terephthalate), 70, 60, 50, 40, 30, 20 and 10 parts by weight of polypropylene and 20 parts by weight of glass to form 7 compositions. The compositions according to this invention are molded into test pieces with a superior combination of properties, i.e., high heat distortion temperatures, impact strengths and flexural strengths. Processability is good and there is no delamination of the work pieces after cooling and standing.

EXAMPLE 18

In an extruder are blended 10 parts by weight of poly(1,4-butylene terephthalate), 10 parts by weight of poly(ethylene terephthalate), 60 parts by weight of polypropylene, 20 parts by weight of fibrous glass reinforcement, 17.2 parts per hundred of resin of poly(2,2-bis(3,5-dibromo-4-hydroxyphenyl)propane carbonate) terminated with tribromophenoxy units (having about 5 repeating units), and 4.3 parts per hundred of resin of antimony oxide. The composition is injection molded into test pieces which are self-extinguishing and the Oxygen Index is high. There is no observable plate-out or volatilization of the components after processing.

Other modifications of the above examples provide compositions within the scope of this invention.

For example, for poly(1,4-butylene terephthalate), substitute a 98/2 1,4-butylene terephthalate-1,4-butylene isophthalate copolyester, a 99/1 1,4-butylene terephthalate-1,4-butylene adipate copolyester or a 98/2 1,4-butylene terephthalate-glycerol terephthalate copolyester.

For polypropylene, substitute a propylene copolymer having a polypropylene backbone and ethylene terminal blocks, nominal 7.5% ethylene.

Compositions according to the present invention are also obtained by modifying the above example.

For the glass fibers, the following reinforcing fillers can be substituted: aluminum powder; asbestos fibers; silicate; bronze powder; ceramic fibers; titanate fibers; quartz and carbon black.

Because of their excellent physical, mechanical, chemical, electrical and thermal properties and the enhanced flame resistance of certain embodiments, the alloyed polyester compositions of this invention have many and varied uses. The compositions may be used alone as molding powders or mixed with other polymers and may contain additional, non-reinforcing fillers, such as wood flour, cloth fibers, clays and the like, as well as pigments and dyes, stabilizers, plasticizers, and the like.

Obviously, other modifications and variations of the present invention are possible in the light of the above teachings. It is, therefore, to be understood that changes may be made in the particular embodiments of this invention described which are within the full intended scope of the invention as defined by the appended claims.

We claim:

1. A thermoplastic, stable blended composition that is rigid at a temperature of 75°–90°F comprising a. from about 1 to about 99 parts by weight of a poly-(ethylene terephthalate) resin and b. from about 99 to about 1 part by weight of a poly(1,4-butylene terephthalate) resin or a copolyester thereof with a minor amount of an aliphatic or aromatic dicarboxylic acid or an aliphatic polyol.

2. A composition as defined in claim 1 wherein component (b) is a poly(1,4-butylene terephthalate) resin.

3. A composition as defined in claim 1 wherein component (a) comprises from about 10 to about 90 parts by weight and component (b) comprises from about 90 to about 10 parts by weight.

4. A composition as defined in claim 1 wherein component (a) comprises from about 20 to about 80 parts by weight and component (b) comprises from about 80 to about 20 parts by weight.

5. A reinforced thermoplastic composition that is rigid at a temperature of 75°–90°F comprising A. a stable, blended resinous combination comprising a. from about 1 to about 99 parts by weight of a poly-(ethylene terephthalate) resin and b. from about 99 to about 1 part by weight of a poly-(1,4-butylene terephthalate) resin or a copolyester thereof with a minor amount of an aliphatic or aromatic dicarboxylic acid or an aliphatic polyol and B. a reinforcing amount of a reinforcing filler for said combination.

6. A composition as defined in claim 5 wherein the reinforcing filler B comprises from about 1 to about 80 percent by weight based on the combined weights of components (a) and (b) and the filler.

7. A composition as defined in claim 5 wherein component (b) is a poly(1,4-butylene terephthalate) resin.

8. A composition as defined in claim 5 wherein the reinforcing filler B is selected from the group consisting of reinforcing metals, ceramics, silicates, quartz, glass and carbons.

9. A composition as defined in claim 8 wherein said reinforcing filler is filamentous glass, in an amount of from about 1 to about 80 percent by weight based on the combined weight of components (a) and (b) and the glass.

10. A reinforced composition as defined in claim 5 wherein, in resinous combination A, component (a) comprises from about 10 to about 90 parts by weight and component (b) comprises from about 90 to about 10 parts by weight.

11. A reinforced composition as defined in claim 5 wherein, in resinous combination A, component (a) comprises from about 20 to about 80 parts by weight and component (b) comprises from about 80 to about 20 parts by weight.

12. A flame retardant thermoplastic composition that is rigid at a temperature of 75°–90°F comprising A. a stable, blended resinous combination comprising a. from about 1 to about 99 parts by weight of a poly-(ethylene terephthalate) resin and b. from about 99 to about 1 part by weight of a poly-(1,4-butylene terephthalate) resin or a copolyester thereof with a minor amount of an aliphatic or aromatic dicarboxylic acid or an aliphatic polyol and B. a flame retardant additive in a minor proportion but in an amount at least sufficient to render resinous combination A non-burning or self-extinguishing.

13. A flame retardant composition as defined in claim 12, the composition also including a polytetrafluoroethylene resin or a fumed colloidal silica in a minor proportion based on said composition but in an amount at least sufficient to render said resinous combination non-dripping, when burning.

14. A flame retardant composition as defined in claim 12 wherein said flame retardant additive is a halogen-containing compound, a halogen-containing compound in admixture with an antimony compound; elemental phosphorus or a phosphorus compound; a halogen-containing compound in admixture with a phosphorus compound; a compound containing phosphorus-nitrogen bonds; or a mixture of the foregoing, and said compound is present in an amount of 0.5 to 50 parts by weight per hundred parts of resinous combination A.

15. A flame retardant composition as defined in claim 14 wherein said flame retardant additive is either i. a low molecular weight polymer of a carbonate of a halogenated dihydric phenol, said polymer containing from 2 to 10 repeating units of the formula

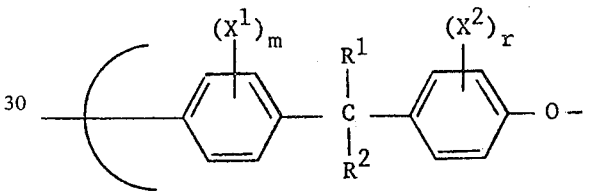

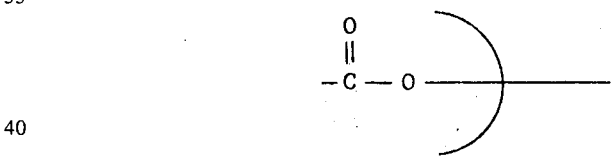

wherein $R^1$ and $R^2$ are hydrogen, (lower)alkyl or phenyl, $X^1$ and $X^2$ are bromo or chloro and $m$ and $r$ are from 1 to 4, said polymer having low volatility when heated above about 200°C., and a softening point of less than about 300°C. or ii. a combination of said polymer (i) and an inorganic or organic antimony-containing compound.

16. A flame retardant composition as defined in claim 15 wherein said low molecular weight polymer (i) is of the formula

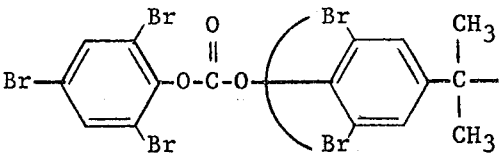

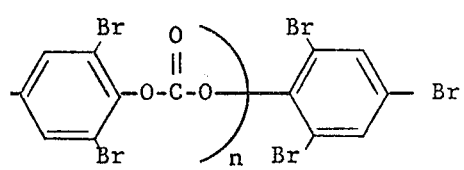

wherein the average number of repeating units, $n$, is from about 3 to 7, and the softening point of said polymer is in the range of from 200° to 260°C.

17. A flame retardant composition as defined in claim 12 wherein component (b) is a poly(1,4-butylene terephthalate) resin.

18. A flame retardant composition as defined in claim 12 wherein, in resinous combination A, component (a) comprises from about 10 to about 90 parts by weight and component (b) comprises from about 90 to about 10 parts by weight.

19. A flame retardant thermoplastic composition as defined in claim 12 wherein, in resinous combination A, component (a) comprises from about 20 to about 80 parts by weight and component (b) comprises from about 80 to about 20 parts by weight.

20. A reinforced flame retardant thermoplastic composition that is rigid at 75°–90°F comprising
   A. a stable, blended resinous combination comprising
      a. from about 1 to about 99 parts by weight of a poly-(ethylene terephthalate) resin and
      b. from about 99 to about 1 part by weight of a poly(1,4-butylene terephthalate) resin or a copolyester thereof with a minor amount of an aliphatic or aromatic dicarboxylic acid or an aliphatic polyol,
   B. a reinforcing amount of a reinforcing filler for said combination A and
   C. a flame retardant additive in a minor proportion but in an amount at least sufficient to render resinous combination A non-burning or self-extinguishing.

21. A reinforced flame retardant composition as defined in claim 20 wherein said component (b) is a poly(1,4-butylene terephthalate) resin.

22. A reinforced flame retardant composition as defined in claim 20 wherein, in resinous combination A, component (a) comprises from about 10 to about 90 parts by weight and component (b) comprises from about 90 to about 10 parts by weight, wherein the average number of repeating units, $n$, is from about 3 to about 7, and the softening point of said polymer is in the range of from 200 to 260°C.

23. A reinforced flame retardant composition as defined in claim 20 wherein, in resinous combination A, component (a) comprises from about 20 to about 80 parts by weight and component (b) comprises from about 80 to about 20 parts by weight.

24. A reinforced flame retardant composition as defined in claim 20 wherein the reinforcing filler B comprises from about 1 to about 80 percent by weight based on the combined weights of components (a) and (b) and the filler.

25. A reinforced flame retardant composition as defined in claim 20 wherein the reinforcing filler B is selected from the group consisting of reinforcing metals, ceramics, silicates, quartz, glass and carbons.

26. A reinforced flame retardant composition as defined in claim 25 wherein said reinforcing filler is filamentous glass, in an amount of from about 1 to about 80 percent by weight based on the combined weights of components (a) and (b) and the glass.

27. A reinforced flame retardant composition as defined in claim 20, the composition also including a polytetrafluoroethylene resin or a fumed colloidal silica in a minor proportion based on said composition but in an amount at least sufficient to render said resinous combination non-dripping, when burning.

28. A reinforced flame retardant composition as defined in claim 20 wherein said flame retardant additive is a halogen-containing compound, a halogen-containing compound in admixture with an antimony compound, elemental phosphorus or a phosphorus compound; a halogen-containing compound in admixture with a phosphorus compound; a compound containing phosphorus-nitrogen bonds; or a mixture of the foregoing, and said compound is present in an amount of 0.5 to 50 parts by weight per hundred parts of resinous component A.

29. A reinforced flame retardant composition as defined in claim 28 wherein said flame retardant additive is either
   i. a low molecular weight polymer of a carbonate of a halogenated dihydric phenol, said polymer containing from 2 to 10 repeating units of the formula

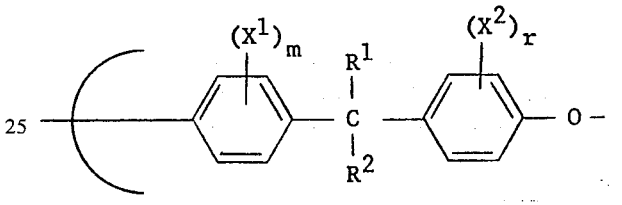

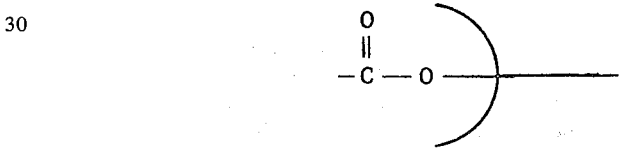

wherein $R^1$ and $R^2$ are hydrogen, (lower)alkyl or phenyl, $X^1$ and $X^2$ are bromo or chloro and $m$ and $r$ are from 1 to 4, said polymer having low volatility when heated above about 200°C., and a softening point of less than about 300°C. or
   ii. a combination of said polymer (i) and an inorganic or organic antimony-containing compound.

30. A reinforced flame retardant composition as defined in claim 29 wherein said low molecular weight polymer (i) is of the formula

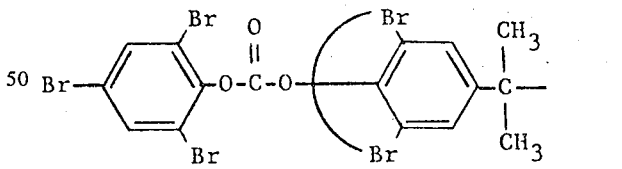

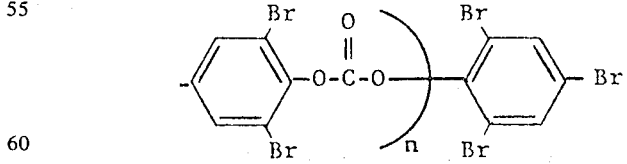

wherein the average number of repeating units, $n$, is from about 3 to about 7, and the softening point of said polymer is in the range of from 200° to 260°C.

31. An intercrystalline thermoplastic composition that is rigid at 75°–90°F comprising
   A. a stable, blended resinous combination comprising a. from about 1 to about 99 parts by weight of a poly(ethylene terephthalate) resin and b. from about 99 to about 1 part by weight of a poly-(1,4-butylene terephthalate) resin or a copolyester thereof with a minor amount of an aliphatic or aromatic dicarboxylic acid or an aliphatic polyol and B. c. at least one high molecular weight normally crystalline, normally amorphous or normally partially crystalline and partially amorphous polymer in the concentration range of from about 1 to about 99 parts by weight of A to from about 99 to about 1 part by weight of B.

32. A composition as defined in claim 31 wherein component (b) is a poly(1,4-butylene terephthalate) resin.

33. A composition as defined in claim 32 wherein component (c) is a high molecular weight normally crystalline linear polypropylene homopolymer or copolymer.

34. A composition as defined in claim 31 which also includes a reinforcing amount of a reinforcing filler for said composition.

35. A composition as defined in claim 34 wherein the reinforcing filler is filamentous glass, in an amount of from about 1 to about 80 percent by weight based on the combined weights of components (a), (b) and (c) and the glass.

36. A flame retardant composition as defined in claim 31 which also includes a flame retardant additive in a minor proportion but in an amount at least sufficient to render the resinous components (a), (b) and (c) non-burning or self-extinguishing.

37. A reinforced, flame retardant composition as defined in claim 31 which also includes a reinforcing amount of a reinforcing filler for said composition and a flame retardant additive in a minor proportion but in an amount at least sufficient to render the resinous components (a), (b) and (c) non-burning or self-extinguishing.

38. A thermoplastic, stable blended composition that is rigid at 75°–90°F, said composition consisting essentially of a. from about 1 to about 99 parts by weight of a poly(ethylene terephthalate) resin and b. from about 99 to 1 part by weight of a poly(1,4-butylene terephthalate) resin or a copolyester thereof with a minor amount of an aliphatic or aromatic dicarboxylic acid or an aliphatic polyol.

39. A reinforced flame retardant composition as defined in claim 29 wherein said reinforcing filler is filamentous glass in an amount of 1 to about 80 percent by weight based on the combined weights of components (a) and (b) and the glass.

40. A reinforced flame retardant composition as defined in claim 39 wherein said filamentous glass is present in an amount of from 5 to about 50% by weight.

* * * * *

UNITED STATES PATENT AND TRADEMARK OFFICE
CERTIFICATE OF CORRECTION

PATENT NO. : 3,953,394
DATED : April 27, 1976
INVENTOR(S) : Daniel W. Fox and Allen D. Wambach It is certified that error appears in the above-identified patent and that said Letters Patent are hereby corrected as shown below:

Column 17, Table 1, Example 6, "223" should be -- 233 --.

Signed and Sealed this

Fourteenth Day of September 1976

[SEAL]

Attest:

RUTH C. MASON
Attesting Officer

C. MARSHALL DANN
Commissioner of Patents and Trademarks

REEXAMINATION CERTIFICATE (689th)
United States Patent [19]
Fox et al.

[11] B1 3,953,394
[45] Certificate Issued  Jun. 2, 1987

[54] POLYESTER ALLOYS AND MOLDING COMPOSITIONS CONTAINING THE SAME

[75] Inventors: Daniel W. Fox; Allen D. Wambach, both of Pittsfield, Mass.

[73] Assignee: General Electric Company, Pittsfield, Mass.

Reexamination Request:
No. 90/000,736, Mar. 11, 1985
No. 90/000,860, Sep. 18, 1985

Reexamination Certificate for:
Patent No.: 3,953,394
Issued: Apr. 27, 1976
Appl. No.: 199,037
Filed: Nov. 15, 1971

Certificate of Correction issued Sep. 14, 1976.

[51] Int. Cl.$^4$ .............. C08L 67/02; C08K 5/49; C08K 3/36; C08K 3/34; C08K 3/22; C08K 3/08; C08K 3/04
[52] U.S. Cl. .............. 524/86; 260/DIG. 35; 524/115; 524/133; 524/135; 524/140; 524/141; 524/142; 524/155; 524/170; 524/171; 524/281; 524/357; 524/358; 524/359; 524/362; 524/367; 524/372; 524/375; 524/392; 524/411; 524/412; 524/440; 524/441; 524/452; 524/462; 524/463; 524/464; 524/466; 524/467; 524/469; 524/470; 524/513; 525/165; 525/173; 525/176; 525/400; 525/439; 525/444; 525/446
[58] Field of Search .............. 525/444, 539

[56] References Cited
U.S. PATENT DOCUMENTS

| | | | |
|---|---|---|---|
| 2,465,319 | 3/1949 | Whinfield et al. | 260/75 |
| 3,047,539 | 7/1962 | Pengilly | 260/75 |
| 3,361,848 | 1/1968 | Siggel et al. | 525/177 |
| 3,368,995 | 2/1968 | Furukawa et al. | 524/381 |
| 3,671,487 | 6/1972 | Abolins | 524/141 |
| 3,688,001 | 8/1972 | Exner et al. | 524/281 |
| 3,814,725 | 6/1974 | Zimmerman et al. | 260/40 R |

FOREIGN PATENT DOCUMENTS

| | | |
|---|---|---|
| 132546 | 5/1949 | Australia . |
| 747243 | 9/1970 | Belgium . |
| 1694217 | 4/1971 | Fed. Rep. of Germany . |
| 1694218 | 4/1971 | Fed. Rep. of Germany . |
| 2042447 | 4/1971 | Fed. Rep. of Germany . |
| 1060401 | 3/1967 | United Kingdom . |

OTHER PUBLICATIONS

Korshak, V. V. and Vinogradova, S. F., *Polyesters*, pp. 13–14, 83–105 (1965), Pergamon Press.
Flory, P. J., "Random Reorganization of Molecular Weight Distribution in Linear Condensation Polymers," *J. Amer. Chem. Soc'y*, vol. 64, pp. 2205 et seq. (1942).
Allport et al.; Block Copolymers; pp. 265–270, 289, 298–299, 363, 386–391, 405–408 (1973), John Wiley & Sons.
Escala et al.; Crystallization Studies of Blends of Polyethylene Terephthalate and Polybutylene Terephthalate; *Multiphase Polymers* (1979).
Davis et al.; Polyester Fibers; *Kirk-Othmer Encycl. Chem Technol.*, vol. 18, p. 545 (1982).

*Primary Examiner*—Lewis T. Jacobs

[57] ABSTRACT

Thermoplastic, stable, blended compositions comprising a combination of (a) a poly(ethylene terephthalate) resin and (b) a poly(1,4-butylene terephthalate) resin. The alloyed combination of resins can be reinforced with fillers and also rendered flame retardant.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 38 is confirmed.

Claims 1, 3–6, 10–12, 18–20, 22–24, and 31 are determined to be patentable as amended.

Claims 2, 7–9, 13–17, 21, 25–30, 32–37, 39 and 40, dependent on an amended claim, are determined to be patentable.

1. A thermoplastic, stable blended composition that is rigid at a temperature of 75°–90° F. [comprising] *consisting essentially of*
   a. from about 1 to about 99 parts by weight of a poly(ethylene terephthalate) resin and
   b. from about 99 to about 1 part by weight of poly(1,4-butylene terephthalate) resin or a copolyester thereof with a minor amount of an aliphatic or aromatic dicarboxylic acid or an aliphatic polyol.

3. A composition as defined in claim 1 wherein component (a) [comprises] *is* from about 10 to about 90 parts by weight and component (b) [comprises] *is* from about 90 to about 10 parts by weight.

4. A composition as defined in claim 1 wherein component (a) [comprises] *is* from about 20 to about 80 parts by weight and component (b) [comprises] *is* from about 80 to about 20 parts by weight.

5. A reinforced thermoplastic composition that is rigid at a temperature of 75°–90° F. [comprising] *consisting essentially of*
   A. a stable, blended resinous combination comprising
      a. from about 1 to about 99 parts by weight of a poly(ethylene terephthalate) resin and
      b. from about 99 to about 1 part by weight of a poly(1,4-butylene terephthalate) resin or a copolyester thereof with a minor amount of an aliphatic or aromatic dicarboxylic acid or an aliphatic polyol and
   B. a reinforcing amount of a reinforcing filler for said combination.

6. A composition as defined in claim 5 wherein the reinforcing filler B [comprises] *is* from about 1 to about 80 percent by weight based on the combined weights of components (a) and (b) and the filler.

10. A reinforced composition as defined in claim 5 wherein, in resinous combination A, component (a) [comprises] *is* from about 10 to about 90 parts by weight and component (b) [comprises] *is* from about 90 to about 10 parts by weight.

11. A reinforced composition as defined in claim 5 wherein, in resinous combination A, component (a) [comprises] *is* from about 20 to about 80 parts by weight and component (b) [comprises] *is* from about 80 to about 20 parts by weight.

12. A flame retardant thermoplastic composition that is rigid at a temperature of 75°–90° F. [comprising] *consisting essentially of*
   A. a stable, blended resinous combination comprising
      a. from about 1 to about 99 parts by weight of a poly(ethylene terephthalate) resin and
      b. from about 99 to about 1 part by weight of a poly(1,4-butylene terephthalate) resin or a copolyester thereof with a minor amount of an aliphatic or aromatic dicarboxylic acid or an aliphatic polyol and
   B. a flame retardant additive in a minor proportion but in an amount at least sufficient to render resinous combination A non-burning or self-extinguishing.

18. A flame retardant composition as defined in claim 12 wherein, in resinous combination A, component (a) [comprises] *is* from about 10 to about 90 parts by weight and component (b) [comprises] *is* from about 90 to about 10 parts by weight.

19. A flame retardant thermoplastic composition as defined in claim 12 wherein, in resinous combination A, component (a) [comprises] *is* from about 20 to about 80 parts by weight and component (b) [comprises] *is* from about 80 to about 20 parts by weight.

20. A reinforced flame retardant thermoplastic composition that is rigid at 75°–90° F. [comprising] *consisting essentially of*
   A. a stable, blended resinous combination comprising
      a. from about 1 to about 99 parts by weight of a poly(ethylene terephthalate) resin and
      b. from about 99 to about 1 part by weight of a poly(1,4-butylene terephthalate) resin or a copolyester thereof with a minor amount of an aliphatic or aromatic dicarboxylic acid or an aliphatic polyol,
   B. a reinforcing amount of a reinforcing filler for said combination A and
   C. a flame retardant additive in a minor proportion but in an amount at least sufficient to render resinous combination A non-burning or self-extinguishing.

22. A reinforced flame retardant composition as defined in claim 20 wherein, in resinous combination A, component (a) [comprises] *is* from about 10 to about 90 parts by weight and component (b) [comprises] *is* from about 90 to about 10 parts by weight, wherein the average number of repeating units, n, is from about 3 to about 7, and the softening point of said polymer is in the range of from 200° to 260° C.

23. A reinforced flame retardant composition as defined in claim 20 wherein, in resinous combination A, component (a) [comprises] *is* from about 20 to about 80 parts by weight and component (b) [comprises] *is* from about 80 to about 20 parts by weight.

24. A reinforced flame retardant composition as defined in claim 20 wherein the reinforcing filler B [comprises] *is* from about 1 to about 80 percent by weight based on the combined weights of components (a) and (b) and the filler.

31. An intercrystalline thermoplastic composition that is rigid at 75°–90° F. comprising
   A. a stable, blended resinous combination [comprising] *consisting essentially of*
      a. from about 1 to about 99 parts by weight of a poly(ethylene terephthalate) resin and b. from about 99 to about 1 part by weight of a poly(1,4-butylene terephthalate) resin or a copolyester thereof with a minor amount of an aliphatic or aromatic dicarboxylic acid or an aliphatic polyol and B. at least one high molecular weight normally crystalline, normally amorphous or normally partially crystalline and partially amorphous polymer in the concentration range of from about 1 to about 99 parts by weight of A to from about 99 to about 1 part by weight of B.

* * * * *